US012610285B2

(12) United States Patent

Schmidt et al.

(10) Patent No.: US 12,610,285 B2

(45) Date of Patent: Apr. 21, 2026

(54) METHOD AND SYSTEM FOR NETWORK MANAGEMENT AND FAIRNESS CRITERIA ADJUSTMENT IN CELLULAR NETWORKS FOR MULTI-DWELLING UNITS

(71) Applicant: VERIZON PATENT AND LICENSING INC., Basking Ridge, NJ (US)

(72) Inventors: Christopher Schmidt, Branchburg, NJ (US); Lily Zhu, Parsippany, NJ (US); Brian T. Mecum, Folsom, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

(21) Appl. No.: 18/490,968

(22) Filed: Oct. 20, 2023

(65) Prior Publication Data

US 2025/0133446 A1     Apr. 24, 2025

(51) Int. Cl.
H04W 28/22          (2009.01)
H04W 48/18          (2009.01)

(52) U.S. Cl.
CPC ........... *H04W 28/22* (2013.01); *H04W 48/18* (2013.01)

(58) Field of Classification Search
CPC .............................. H04W 28/22; H04W 48/18
See application file for complete search history.

(56) References Cited

U.S. PATENT DOCUMENTS

| | | | | |
|---|---|---|---|---|
| 12,143,354 B1 * | 11/2024 | Martin | .................... | H04L 63/20 |
| 2012/0089845 A1 * | 4/2012 | Raleigh | ............... | H04L 41/0894 |
| | | | | 709/224 |
| 2015/0055469 A1 * | 2/2015 | Lee | ........................ | H04L 47/127 |
| | | | | 370/235 |

* cited by examiner

*Primary Examiner* — Mohammad S Anwar

(57)          ABSTRACT

Methods and systems are provided for managing data transmission within a cellular network. A base station detects the attachment of a Fixed Wireless Access (FWA) gateway. Upon detection, the base station determines a traffic cap for the FWA gateway based on this attachment. The base station then generates a normalized data rate for the FWA gateway by weighting its achieved data rate. Subsequently, the fairness criteria of a Radio Access Network (RAN) scheduler are adjusted based on this normalized data rate. This methodology ensures a balanced and efficient allocation of resources within the network.

20 Claims, 4 Drawing Sheets

400

METHOD AND SYSTEM FOR NETWORK MANAGEMENT AND FAIRNESS CRITERIA ADJUSTMENT IN CELLULAR NETWORKS FOR MULTI-DWELLING UNITS

BACKGROUND

Cellular networks provide communication services to a variety of environments including multi-dwelling units (MDUs), such as apartment buildings or offices, which house multiple individual users. Fixed Wireless Access (FWA) gateways are often utilized in such settings to facilitate network connectivity to various devices within the MDU. MDUs can, by nature of the number of connected devices, consume more resources than single dwelling units.

DETAILED DESCRIPTION

Figure 1:
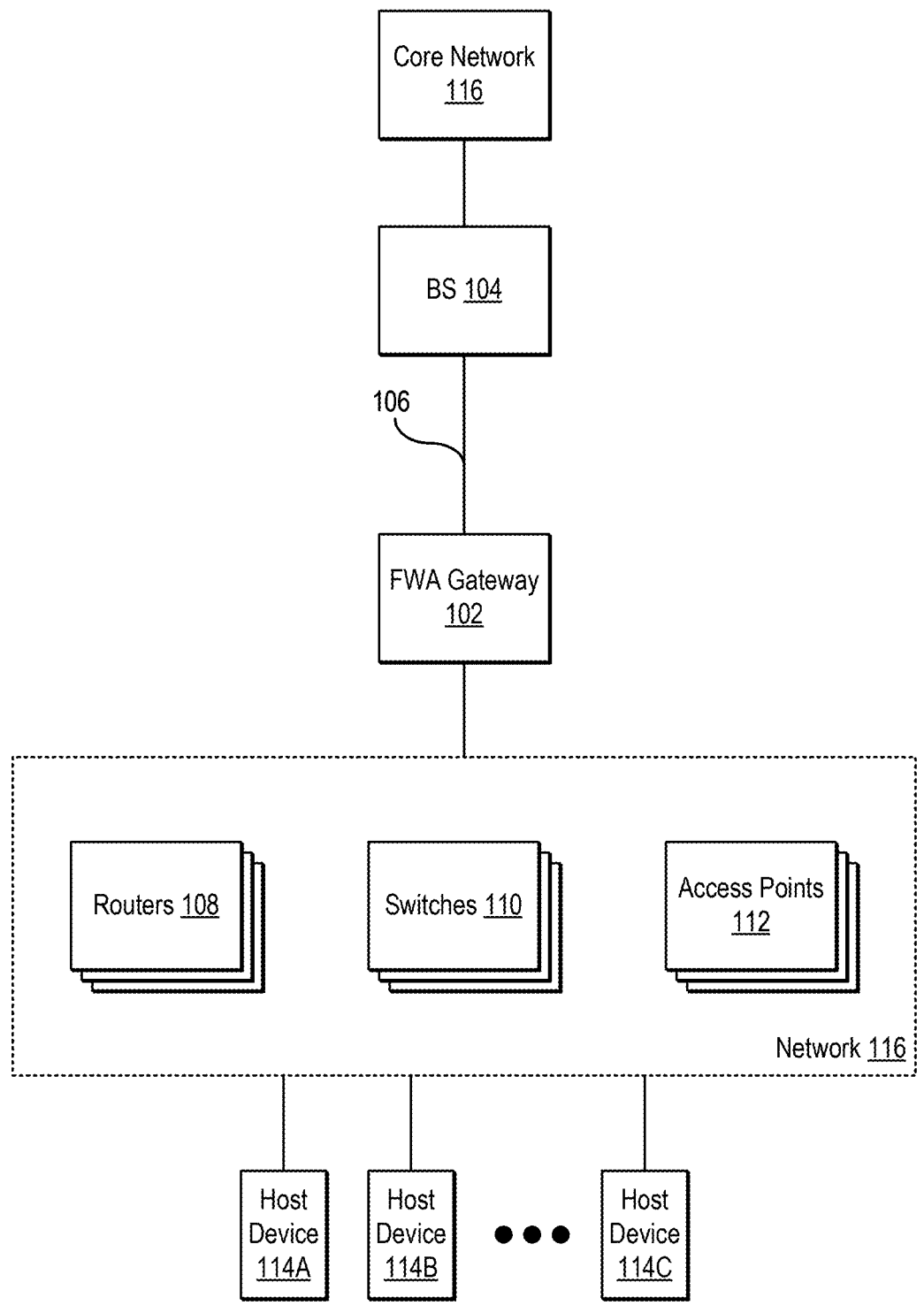
FIG. 1 is a block diagram illustrating a network including an MDU that includes a FWA gateway.

A single FWA gateway in an MDU can manage data traffic for various users and devices. An FWA gateway in an MDU can appear to a base station as a single device, despite handling traffic for many sources. Thus, in some current systems, MDUs can be penalized as "heavy" sources of traffic despite the distribution of that traffic among many devices.

The disclosed embodiments provide systems and methods to manage network resources by utilizing network slicing where each slice for an MDU can be tailored to meet different service requirements. Further, during the attachment of an FWA gateway in an MDU, the embodiments can allocate specialized traffic caps and adjust fairness criteria in distributing network resources. This ensures that a required service level for an FWA gateway in an MDU is not penalized due to its handling of multiple host devices when compared to single dwelling gateway, providing a fair share of network bandwidth to the FWA gateway in the MDU while maintaining optimal network performance and service quality for all users, both within and outside the MDU.

In one implementation, the method comprises a series of steps initiated by a Fixed Wireless Access (FWA) gateway (e.g., a Fixed Wireless Access (FWA)). Initially, the FWA gateway receives a packet from a Local Area Network (LAN) device. Subsequently, the FWA gateway extracts a virtual network identifier from the packet. Utilizing the virtual network identifier, the FWA gateway identifies traffic to map to a corresponding network slice. Thereafter, the FWA gateway may establish a data session employing the identified network slice, and transmits the packet to a cellular base station through the network slice.

In additional implementations, the step of extracting a virtual network identifier can include acquiring a Virtual LAN (VLAN) tag from the packet or obtaining a Service Set Identifier (SSID) from the packet. The identification of the network slice can be executed by querying the cellular base station with the virtual network identifier to retrieve a slice identifier. Alternatively, it may involve identifying a Service Slice Type (SST) value for a Single-Network Slice Selection Assistance Information (S-NSSAI) identifier based on the virtual network identifier. Moreover, the identification of the network slice may comprise determining a Slice Differentiator (SD) value for the S-NSSAI identifier based on the LAN device.

Furthermore, the method can comprise additional steps performed by a cellular base station. Initially, the cellular base station detects the attachment of the FWA gateway. Based on the attachment of the FWA gateway, the cellular base station determines a traffic cap to apply. In some implementations, this traffic cap can be determined based on, for example, a subscriber account (e.g., price plan) associated with the MDU. Subsequently, the cellular base station computes a data rate for the FWA gateway and adjusts the fairness criteria of a Radio Access Network (RAN) scheduler based on the computed data rate. In some implementations, weighting the data rate for the FWA gateway includes computing the data rate based on observed data volumes of the FWA gateway and at least one other user equipment (UE). In some implementations, weighting the data rate for the FWA gateway includes computing the data rate based on a fixed weighting factor defined in a service level agreement associated with the FWA gateway. In some implementations, weighting the data rate for the FWA gateway includes computing a ratio between an achieved data rate of the FWA gateway and a guaranteed data rate in a service level agreement associated with the FWA gateway.

In further embodiments, devices, systems, and computer-readable media are also disclosed for performing the above methods.

FIG. 1 is a block diagram illustrating a network including an MDU that includes a FWA gateway.

In the illustrated figure, a cellular network includes a base station (BS 104) and a core network 116. An MDU has a fixed wireless access gateway (FWA gateway 102) installed. The FWA gateway 102 communicates with BS 104 via an air interface 106. In some implementations, FWA gateway 102 communicates with BS 104 and can communicate data through one or more network slices in a 5G cellular network. An MDU may include various network elements to define a local area network (LAN) such as network 116. Examples of such network elements include routers 108, switches 110, and access points 112. The MDU may provide LAN and wide area network (WAN) network connectivity to various computing devices including host device 114A, host device 114B, and host device 114C. The specific number of each of the elements is not limiting.

Figure 2:
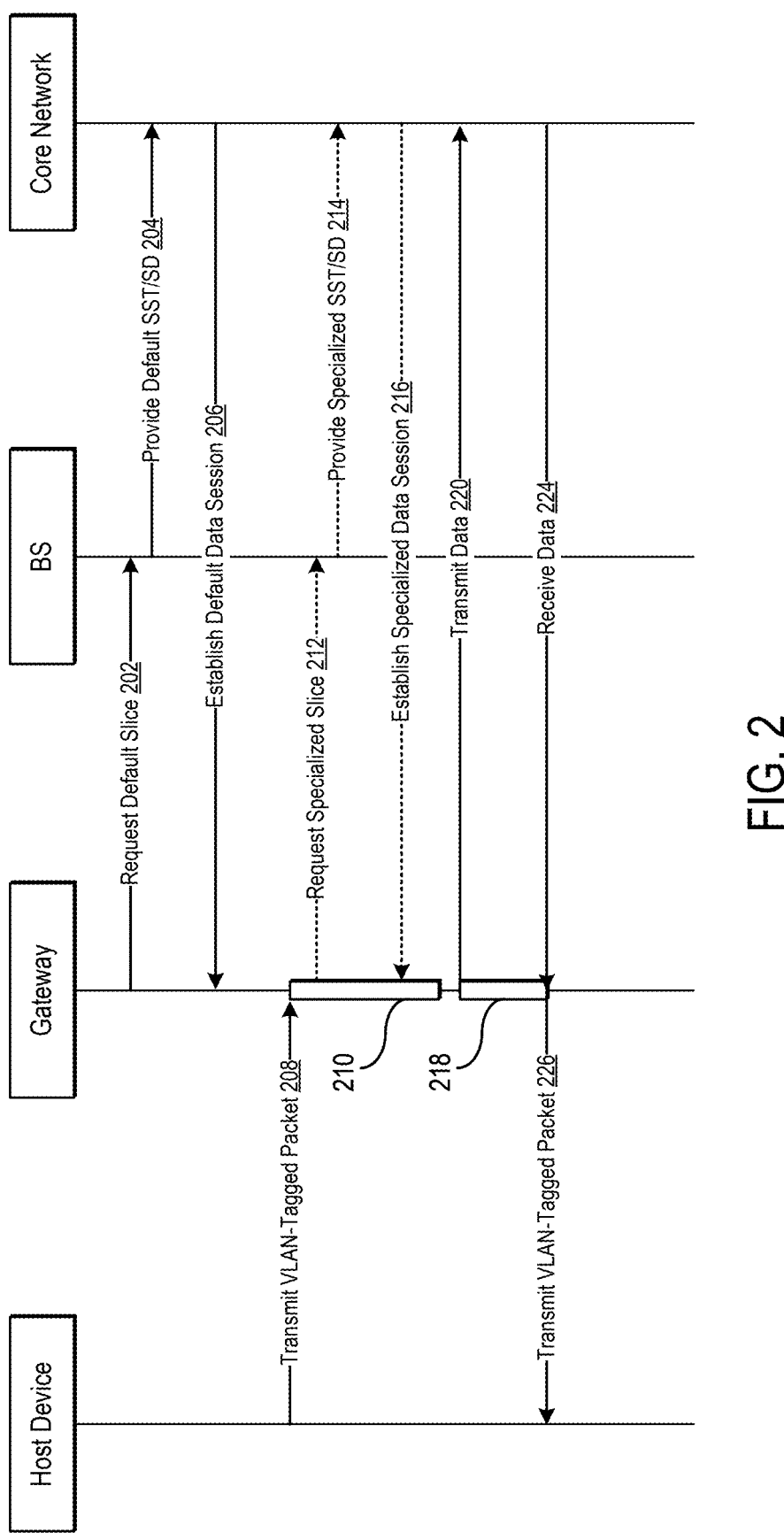
FIG. 2 is a sequence diagram illustrating the creation and management of cellular slices for an MDU.

In some implementations, FWA gateway 102 can comprise a hardware and/or software device that can establish a communication link between the cellular network and the local area network (LAN) within the MDU over air interface 106. The FWA gateway 102 can include hardware components such as transceivers, antennas, processors, and memory devices. The FWA gateway 102 can have built-in software or firmware that facilitates its communication with BS 104 via air interface 106. This software can manage the encoding, decoding, and routing of data packets between the cellular network and the LAN. Moreover, FWA gateway 102 can handle network slicing in a 5G cellular network, where it can manage different network slices for varied data traffic requirements. Specific details of network slicing capabilities of the FWA gateway 102 are provided next in the description of FIG. 2 are not repeated herein.

BS 104 serves as an initial point of contact between the cellular network and the FWA gateway 102. In some implementations, BS 104 can comprise a gNodeB of a 5G radio access network (RAN). BS 104 can handle requests for network slices from the FWA gateway 102, forwarding these requests to the core network 116 for validation and establishment. In some implementations, BS 104 can have a local or associated database or a configuration file containing mappings of Service Slice Type (SST) and Slice Differentiator (SD) values of Single-Network Slice Selection Assistance Information (S-NSSAI) information elements to specific network slices and their resource allocations. This can facilitate quick referencing and efficient handling of slice requests from the FWA gateway 102. Although network slicing and S-NSSAI information elements are discussed, the disclosure is not limited as such, and other types of network segmentation or identification methodologies can be employed. For instance, techniques such as Quality of Service (QoS) identifiers, VLAN tagging, or other forms of network partitioning and traffic differentiation mechanisms could be utilized. Moreover, the principles and operations outlined can be extended to various cellular network technologies beyond the mentioned, enabling a broad spectrum of implementations for improved network management in MDUs and other similar settings.

In some implementations, BS 104 can aggregate all MDU traffic and can apply different traffic caps to create various traffic tiers. Given the volume of traffic handled by an FWA gateway in an MDU, which is significantly higher compared to a regular single household router/customer premise equipment (CPE), such traffic caps can ensure fairness in resource scheduling. Within the RAN scheduler of BS 104, fairness criteria can be employed to adjust the scheduling of data. In some implementations, this can involve using a configurable weight factor based on Service Level Agreement (SLA) targets associated with special traffic tiers, aiding in the normalization of the achieved data rate of the MDU when compared to other single user devices. Moreover, BS 104 can also provide service differentiation within an individual FWA gateway in an MDU. By analyzing the SD, BS 104 can facilitate differential treatment of various types of traffic such as low latency or high reliability traffic. Details of this operation are provided in more detail in FIG. 3.

Core network 116 can manage network resources and establish network slices. It contains servers, routers, and other network equipment necessary for managing network traffic and resources. It can validate and process requests for network slices, coordinating with BS 104 to establish, manage, and maintain the requested slices, ensuring proper routing and allocation of network resources per the slicing requirements.

Core network 116 can maintain a centralized database or a Network Slice Selection Function (NSSF) that stores and manages SST/SD combinations, mapping them to specific network slices and their associated resource allocations. For example, in a 5G network, the NSSF can be a dedicated function for managing network slice selection based on the S-NSSAI, which comprises the SST and SD values. The NSSF can process slice requests, determine the appropriate network slice based on the SST/SD values provided, and coordinate with other network functions like the Access and Mobility Management Function (AMF) and Session Management Function (SMF) to establish and manage the requested slices, ensuring the necessary resources are allocated and the network policies are adhered to.

As one example, if a slice request with a particular SST/SD combination is received, the NSSF within the core network 116 can query its database or communicate with other network functions to determine the slice and resource allocations corresponding to that SST/SD combination and initiate the necessary procedures to establish or manage the slice as per the request.

In an implementation, a host device refers to any type of computing device, mobile or otherwise, that can connect to the network for communication purposes. In some implementations, host devices may include laptop, desktop, mobile, tablet, or similar devices. In general, the host devices may include a network interface allowing the host devices to interact with the network through the FWA gateway 102 via Ethernet, Wi-Fi, or similar protocols to access various services and resources. In some implementations, the host devices may include cellular user equipment (UE), however these devices may communicate over network 116 and not via a RAN when operating as described herein.

In some implementations, network 116 represents a local area network (LAN) within the MDU, comprising various network elements that facilitate data communication and connectivity among the devices within the MDU and to external networks. Network 116 can utilize VLAN tagging to differentiate between different virtual networks and to assist in network slice selection later in the network hierarchy. Routers 108 are network devices that route data packets between different networks. Router 108 can use Internet Protocol (IP) addresses to determine the best path for data packet delivery. In some implementations, routers 108 can employ VLAN tagging to manage and segregate traffic within different virtual networks, aiding in the identification and management of network slices. Switches 110 manage data traffic within the LAN by forwarding data packets to specific devices based on media access control (MAC) addresses. Switches 110 can also utilize VLAN tagging to segregate and manage traffic, aiding in the efficient allocation and utilization of network resources, and assisting in network slice selection by identifying the nature and priority of the data traffic. Access points 112 can extend the wireless coverage of the network, allowing host devices to connect to the network wirelessly. Access points 112 can employ SSID (Service Set Identifier) identification to create separate wireless networks, each with its own network settings and policies. This SSID identification can also be used (e.g., by FWA gateway 102) for network slice selection, where different SSIDs can correspond to different network slices or quality of service levels, ensuring the requisite network resources are allocated based on the SSID and the associated network policies. In some implementations, VLAN tags and SSIDs are referred to as virtual network identifiers.

FIG. 2 is a sequence diagram illustrating the creation and management of cellular slices for an MDU.

In step 202, the gateway (e.g., a FWA, etc.) requests a default slice.

In some implementations, this can include an FWA gateway issuing a registration request to a base station specifying a default slice. This request may establish a baseline communication channel with the cellular network infrastructure, ensuring a foundational level of connectivity and service. In some implementations, this step encapsulates the FWA gateway sending a registration request to a base station, specifying a default slice. This default slice may identify the nature and scope of network services that are accessible to the FWA gateway, and by extension, to the users and devices using the FWA gateway for network connectivity.

In some implementations, this default slice can be identified using a special SST value of an S-NSSAI identifier. This SST can signify a generic or default nature of the requested slice, thereby enabling the cellular network to process this request in a standardized or predefined manner. In some implementations, the SD component of the S-NS-SAI identifier can be specified to further refine or categorize the requested slice. Alternatively, in other implementations, the SD value may be left unspecified or blank, thereby allowing for a broader or more generalized slice request.

In step 204, in response, the base station can communicate with the core network to validate the FWA gateway and confirm the requested slice.

After the transmission of the default slice request from the FWA gateway, the base station initiates a communication with the core network to validate the FWA gateway and to confirm the validity and availability of the requested slice. This step can ensure that the requested slice aligns with the current network configurations and that the FWA gateway is authenticated to request such network resources.

In some implementations, the base station may employ a series of validation protocols to ascertain the authenticity and authorization level of the FWA gateway. This could include verifying the credentials of the FWA gateway, checking its registration status within the network, and assessing its compliance with network policies governing slice requests. Specific details of authenticating an FWA gateway (e.g., a subscriber) are not provided herein and existing techniques for doing so may be used.

Concurrently, the base station can communicate with the core network to verify the availability and appropriateness of the requested slice. This can include confirming the network's current slice configurations, availability of resources, and any other prerequisites or conditions that may affect the provision of the requested slice to the FWA gateway.

In certain embodiments, the communication between the base station and the core network may be facilitated through standardized network protocols and interfaces, ensuring a seamless and secure exchange of validation and confirmation information. This communication may also involve the exchange of technical parameters related to the requested slice, such as its SST and SD values as stipulated in the S-NSSAI identifier, and other relevant network configurations that would enable the provisioning of the requested slice.

In step 206, the core network, after validating the FWA gateway and requested slice, establishes a default data session using the requested slice. In some implementations, this default data session can comprise a "fallback" data session for all traffic from the FWA gateway. As will be discussed, a more specialized slice can also be created between the FWA gateway and core network.

Following the validation of the FWA gateway and the confirmation of the requested slice by the core network, the core network can establish a default data session utilizing the requested slice. This can establish a default data communication channel between the FWA gateway and the core network, which can be utilized for transmitting and receiving data in the absence of a more specific slice relevant to data traffic.

In some implementations, this default data session can act as a "fallback" data session for all traffic originating from or destined to the FWA gateway. This fallback functionality can ensure that there is a reliable, albeit possibly generic, data communication pathway available at all times, thereby ensuring continuity of service even in scenarios where more specialized network slices are not available or not yet set up. Further, in some implementations, this channel can be used as an administrative channel allow for maintenance data to be exchanged between the FWA gateway and the core network.

In certain embodiments, the establishment of this default data session can involve the allocation of network resources, setting up of routing paths, and the configuration of necessary network parameters to ensure the desired level of Quality of Service (QoS) and other operational requisites.

In step 208, the FWA gateway receives a VLAN-tagged packet from a LAN device. In some implementations, the LAN device can comprise a host device or a network device (e.g., router, switch, etc.) and the specific device is not limiting. Certainly, the VLAN-tagged packet can be received through multiple devices as it traverses the network.

The FWA gateway can receive a VLAN-tagged packet from a LAN device connected in a building or dwelling housing the FWA gateway. In some implementations, the LAN device can comprise a host device or a network device such as a router or switch, and the specific device is not limiting. The VLAN-tagged packet can carry information regarding the virtual network from which it originates, which can be used to determine network slicing requirements, as will be discussed. In some implementations, the VLAN-tagged packet can traverse through multiple network devices before reaching the FWA gateway. Each of these devices can have the capability to read or modify the VLAN tag, thereby potentially altering the network slice determination or other routing decisions made by the FWA gateway. The reception of the VLAN-tagged packet can trigger the FWA gateway to examine the VLAN tag to identify any specific network slice requirements. In certain network configurations, different VLAN tags can correspond to different network slices or different quality of service levels, enabling a granular level of network resource allocation and traffic management by the FWA gateway via slice selection and allocation.

Although VLAN tags are described, the method can also utilize (in the alternative or in combination with VLAN tags) Service Set Identifier (SSID) values for wireless host devices. Specifically, SSID values can serve as an alternative or complementary mechanism to VLAN tags for classifying packets, especially in a wireless communication scenario within the MDU. Each SSID value can represent a distinct wireless network within the same physical infrastructure, allowing for the segregation of traffic based on network identifiers. Similar to VLAN tags, SSID values can be mapped to specific network slices, enabling a structured approach to managing network resources. In some implementations, when a packet is received at the FWA gateway 102 from a wireless host device, the SSID value from which the packet originates can be extracted and utilized to determine the appropriate network slice for routing the packet. The SSID value can be indicative of the quality of service, priority, or other network parameters associated with the packet, assisting the FWA gateway 102 in making informed routing decisions.

In step 210, the FWA gateway determines if a specialized slice is required. In some implementations, the FWA gateway can store a mapping of VLAN tags to slice identifiers. In some implementations, the FWA gateway can store a mapping of VLAN tags to SD fields of an S-NSSAI identifier. In some implementations, the FWA gateway can alternatively query the core network using a VLAN tag to obtain a slice identifier. If the receive VLAN tag requires a specialized slice for which a PDU session has not been established, the method proceeds to step 212 where it requests a specialized slice, step 214 where the base station communicates with the core network, and step 216 where the core network establishes a PDU session using the specialized slice. These operations are similar to steps 202 through step 206, albeit with a different SD value.

The FWA gateway can determine if a specialized slice is required based on the VLAN tag of the received packet. In some implementations, the FWA gateway can store a mapping of VLAN tags to slice identifiers or to SD fields of an S-NSSAI identifier. This mapping can assist the FWA gateway in identifying the specific network slice requirements associated with the VLAN tag. Alternatively, in other implementations, the FWA gateway can query the core network using the VLAN tag to obtain a slice identifier, providing a dynamic approach to determining the appropriate network slice. However, in such an implementation, the FWA gateway may be configured to provision network elements to use VLAN tags based on the VLAN tags defined in the core network. In some implementations, this can entail utilizing a standard format for VLAN tags to assist in mapping VLAN tags to slices. In some implementations, the VLAN tag can encode the SD (and optionally an SST) value itself and thus the method can include extracting an SD (and optionally an SST) from the VLAN tag itself.

If the FWA gateway determines that a specialized slice is needed and it has not established a PDU session for the needed slice, the method can proceed to step 212, where the FWA gateway can request a specific slice from the core network. This request can include updated or additional SD values to specify the nature of the specialized slice.

In step 214, the base station can communicate with the core network to validate the request for a specialized slice. This validation can involve checking the availability of network resources, verifying the authorization of the FWA gateway to request a specialized slice, and confirming the feasibility of establishing such a slice given the current network conditions.

Following the validation, in step 216, the core network can establish a PDU session using the specialized slice. The establishment of this PDU session can involve allocating the necessary network resources, configuring the network parameters, and setting up the routing paths to facilitate the data transfer using the specialized slice. This establishment can mirror the process described in earlier steps for establishing a default slice, but with potentially different network configurations and parameters to handle the specialized nature of the requested slice.

In step 218, the method uses either the default slice or specialized slice (as determined based on the VLAN tag) to complete the data transfer. The selection between the default and specialized slice can be based on the requirements encapsulated in the VLAN tag. The FWA gateway can transmit the VLAN-tagged packet to the core network using the appropriate slice.

In step 220, the FWA gateway transmits the VLAN-tagged packet (as-is or stripped of VLAN data) to the core network using the appropriate slice. In some implementations, the FWA gateway can transmit the VLAN-tagged packet as-is, preserving the VLAN tag for further network processing. Alternatively, in other implementations, the FWA gateway can strip the VLAN data before transmission, depending on the network configuration and the slice being used.

In step 224, the FWA gateway receives responsive data from the core network. This responsive data can be associated with the initial VLAN-tagged packet transmitted in step 220 and can be conveyed back to the FWA gateway through the established network slice, be it default or specialized. The receipt of this responsive data can signify the completion of a round-trip data transfer between the LAN and the cellular network, facilitated by the network slicing mechanism outlined in the preceding steps.

In step 226, the FWA gateway transmits a VLAN-tagged packet back to the receiver that includes the responsive data.

In some implementations, the FWA gateway can encapsulate the responsive data within a VLAN-tagged packet, utilizing the same VLAN tag as the initial packet received in step 208, or a different VLAN tag based on the network configuration or the instructions received from the core network. The VLAN tag can serve as an identifier for routing the packet within the LAN and for potentially determining any subsequent network slice requirements should the data transfer process continue or evolve.

In the foregoing process, a FWA gateway can thus dynamically manage slices for each host device to enable differentiated services to host devices via specialized SD values. Further, the classification of the FWA gateway as a gateway serving multiple end-users can be encapsulated in the SST field of the S-NSSAI. Such a process can allow the core network to distinguish between FWA gateways established with a single user and FWA gateways deployed in larger network environments.

Figure 3:
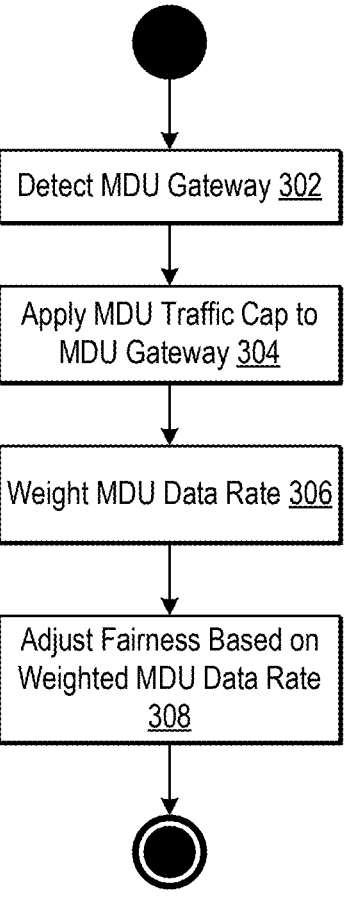
FIG. 3 is a flow diagram illustrating a method for adjusting the scheduling of data for an MDU.

FIG. 3 is a flow diagram illustrating a method for adjusting the scheduling of data for an MDU.

In step 302, the method can include detecting the attachment of a FWA gateway in an MDU.

In some implementations, the method can detect an FWA gateway in an MDU via handshake protocols, authentication processes, or signaling messages between the FWA gateway in an MDU and the base station. In other implementations, the method can utilize a subscriber profile identity (SPID) or radio access technology (RAT) frequency selection priority (RFSP) index or subscribed RFSP to identify an FWA gateway. In other implementations, a separate slice request message can be used to identify an FWA gateway in an MDU. In some implementations, the detection of the MDU FWA gateway's attachment could trigger a series of predefined actions within the network infrastructure. For instance, it might prompt the initialization of specific network configurations, the allocation of additional network resources, or the activation of certain network slices tailored for MDU environments. Furthermore, the detection in step 302 might also entail identifying certain attributes or parameters associated with the FWA gateway in an MDU, such as its capabilities, the anticipated volume of traffic, or the number of connected devices within the MDU. This information can be instrumental for the subsequent steps in the method, aiding in the precise allocation of network resources, the provisioning of the necessary SLA for MDU service, and the effective management of traffic emanating from or directed towards the FWA gateway in an MDU.

In step 304, the method can include applying a specialized traffic cap to the FWA gateway in an MDU.

In some implementations, this traffic cap can comprise a higher traffic cap than a default traffic cap assigned to a single-user UE or single-subscriber gateway. In some implementations, the traffic cap can delineate the maximum amount of data traffic that the FWA gateway is permitted to handle over a specified period. The specialized traffic cap can be designed to accommodate the potentially higher traffic demands typical of a multi-dwelling environment compared to a single-subscriber scenario. This differentiation in traffic cap thresholds is reflective of the disparate traffic demands and network resource requirements between MDU and single-subscriber scenarios.

In some implementations, the traffic cap can comprise an aggregated traffic cap for the base station. In some implementations, this aggregation can encapsulate a cumulative limit on the data traffic that can be managed by the base station from all connected FWA gateways including MDU FWA gateways.

In certain implementations, the traffic cap may be dynamically adjustable, based on real-time network conditions, the prevailing traffic load, or other network parameters. This dynamic adjustability can used for maintaining network performance and service quality, especially in a fluctuating network environment inherent to MDU scenarios.

In step 306, the method can include weighting a data rate for an FWA gateway in an MDU.

In some implementations, the data rate can comprise an achieved data rate for the FWA gateway. In some implementations, this FWA gateway data rate can be compared against other attached UEs to ensure the equitable distribution of data among all UEs attached to a given base station. In some implementations, since the FWA gateway in an MDU handles more traffic than a single-subscriber UE, the weighting can be chosen to normalize the MDU data rate when compared to other single-subscriber data rates, thereby ensuring an equal comparison.

Since an FWA gateway in an MDU generally will consume and produce more than other non-MDU UEs, step 306 includes weighting the data rates for MDU FWA gateways to normalize data rates which aids applying fairness criteria equally. For example, a single-user UE may consume 20 MB in a fixed period of time, while an MDU FWA having ten UEs identical to the single-user UE would result in the FWA gateway appearing to consume 200 MB of data. Existing fairness criteria would thus "punish" the FWA gateway as consuming too many resources, despite the non-cellular host devices receiving the same quality of service.

In some implementations, a weighting parameter can be computed to adjust the data rate of the FWA gateway in an MDU. Various approaches can be used to determine such a weight. In a first implementation, the method can compare data volumes between non-MDU UEs and MDU FWA gateways to compute a weighting parameter to normalize data rates. For example, continuing the previous example, a weighting parameter of 0.1 may be computed (20/200) and applied to actual data rate of the MDU FWA gateway. In some implementations, this calculation can be performed only on the downlink data, however the uplink may be considered as well.

In other implementations, the weighting parameter can be set by an SLA corresponding to a subscriber account associated with the MDU FWA gateway. For example, the SLA may specify a weighting factor of 0.1 for the MDU FWA gateway. In this example, the method would apply the weighting factor without consideration of the data volume.

In yet other implementations, a ratio can be computed to determine how to weight data rates of non-MDU UEs and MDU FWA gateways. In some implementations, a base station can measure achieved data rate. Here, achieved data may comprise egress data from the base station to the FWA gateway. Further, the method can identify a corresponding SLA which defines an agreed upon egress data rate. In some implementations, the method can compute the ratio of the achieved data rate to the SLA data rate and use this ratio as the weighting factor. For example, a non-MDU UE may have an SLA specifying a guaranteed data rate of 10 Mbps while the achieved data rate of that non-MDU UE may be 20

Mbps. In this example, the ratio may be computed as 200% (20 Mbps/10 Mbps). By contrast, an MDU FWA gateway may have an SLA specifying a guaranteed data rate of 1 Gbps but may have achieved only a rate of 200 Mbps giving a ratio of 20% (200 Mbps/1,000 Mbps). In some implementations, these ratios can be used to normalize and adjust the data rates of all UEs managed by a base station before fairness criteria are applied.

In some implementations, this data rate can be further adjusted on a per-device or per-slice basis using the value of the SD parameter of the S-NSSAI for differentiated services. For example, while default MDU traffic may use a first weighting factor, a higher throughput slice (e.g., for a higher-paying customer or for a higher-volume application such as gaming) can be assigned a higher gamma value. In some implementations, the method can include aggregating the per-slice data transfer rates into a single value for a given MDU.

In step 308, the method can include adjusting fairness criteria of the RAN scheduler based on the data rates computed in step 306.

The method can adjust the fairness criteria of the RAN scheduler based on the data rates computed in step 306. This adjustment is crucial for ensuring an equitable distribution of network resources among the FWA gateway in an MDU and other attached UEs or single-subscriber gateways.

In some implementations, the adjustment of the fairness criteria may involve modifying the scheduling algorithms of the RAN scheduler to take into account the weighted data rates computed previously. This can help in ensuring that the FWA gateway, which typically handles a higher volume of traffic, is accorded a fair share of network resources relative to its load, without adversely affecting the network performance for other non-MDU users. Furthermore, the adjusted fairness criteria can contribute to a more balanced and efficient utilization of network resources. For instance, it can help in preventing network congestion or in ensuring that high-priority or time-sensitive traffic is handled appropriately, even during periods of high network load.

In some implementations, the adjustment of the fairness criteria could be done dynamically, in real-time or near real-time, based on the prevailing network conditions, the current traffic load, or other relevant network parameters. This dynamic adjustment can aid in maintaining a high level of network performance and service quality, adapting to the changing traffic patterns and network demands typical in a multi-dwelling unit environment.

Moreover, the adjustment in the fairness criteria can be fine-tuned based on various factors such as the type of traffic, the priority level, the network slice requirements, or other network policies. This fine-tuning can be vital for ensuring that the network resources are allocated and managed in a manner that aligns with the operational goals and the service level agreements (SLAs) stipulated for the MDU and other network users.

Figure 4:
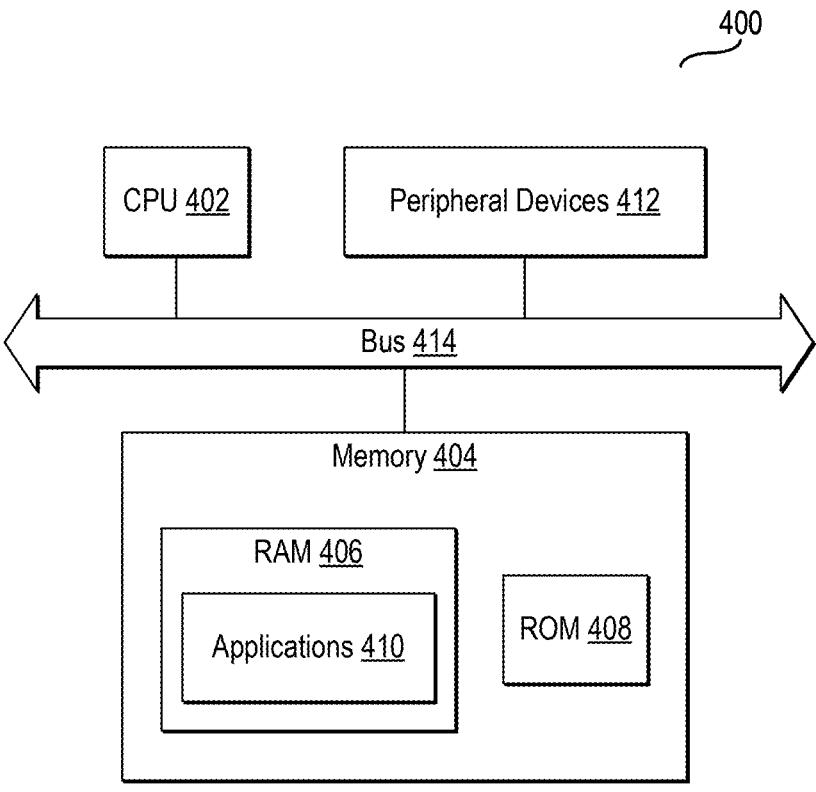
FIG. 4 is a block diagram of a computing device according to some embodiments of the disclosure.

FIG. 4 is a block diagram of a computing device according to some embodiments of the disclosure.

As illustrated, the device 400 includes a processor or central processing unit (CPU) such as CPU 402 in communication with a memory 404 via a bus 414. The device also includes one or more input/output (I/O) or peripheral devices 412. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 402 may comprise a general-purpose CPU. The CPU 402 may comprise a single-core or multiple-core CPU. The CPU 402 may comprise a system-on-a-chip (SoC) or a similar embedded system. In some embodiments, a graphics processing unit (GPU) may be used in place of, or in combination with, a CPU 402. Memory 404 may comprise a memory system including a dynamic random-access memory (DRAM), static random-access memory (SRAM), Flash (e.g., NAND Flash), or combinations thereof. In one embodiment, the bus 414 may comprise a Peripheral Component Interconnect Express (PCIe) bus. In some embodiments, the bus 414 may comprise multiple busses instead of a single bus.

Memory 404 illustrates an example of a non-transitory computer storage media for the storage of information such as computer-readable instructions, data structures, program modules, or other data. Memory 404 can store a basic input/output system (BIOS) in read-only memory (ROM), such as ROM 408 for controlling the low-level operation of the device. The memory can also store an operating system in random-access memory (RAM) for controlling the operation of the device.

Applications 410 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 406 by CPU 402. CPU 402 may then read the software or data from RAM 406, process them, and store them in RAM 406 again.

The device may optionally communicate with a base station (not shown) or directly with another computing device. One or more network interfaces in peripheral devices 412 are sometimes referred to as a transceiver, transceiving device, or network interface card (NIC).

An audio interface in peripheral devices 412 produces and receives audio signals such as the sound of a human voice. For example, an audio interface may be coupled to a speaker and microphone (not shown) to enable telecommunication with others or generate an audio acknowledgment for some action. Displays in peripheral devices 412 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 412 may comprise any input device arranged to receive input from a user. An illuminator in peripheral devices 412 may provide a status indication or provide light. The device can also comprise an input/output interface in peripheral devices 412 for communication with external devices, using communication technologies, such as USB, infrared, Bluetooth®, or the like. A haptic interface in peripheral devices 412 provides tactile feedback to a user of the client device.

A GPS receiver in peripheral devices 412 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   detecting, by a base station, an attachment of an FWA gateway;
   determining, by the base station, a traffic cap to apply to the FWA gateway based on the attachment;
   generating, by the base station, a normalized data rate for the FWA gateway by weighting an achieved data rate of the FWA gateway; and
   adjusting, by the base station, a fairness criteria of a Radio Access Network (RAN) scheduler based on the normalized data rate.

2. The method of claim 1, wherein weighting the data rate for the FWA gateway comprises computing the data rate based on observed data volumes of the FWA gateway and at least one other user equipment (UE).

3. The method of claim 1, wherein weighting the data rate for the FWA gateway comprises computing the data rate based on a fixed weighting factor defined in a service level agreement associated with the FWA gateway.

4. The method of claim 1, wherein weighting the data rate for the FWA gateway comprises computing a ratio between an achieved data rate of the FWA gateway and a guaranteed data rate in a service level agreement associated with the FWA gateway.

5. The method of claim 1, further comprising assigning the FWA gateway to a network slice based on a requested a Service Slice Type (SST) value for a Single-Network Slice Selection Assistance Information (S-NSSAI) identifier, the SST value selected based on a virtual network identifier detected by the FWA gateway.

6. The method of claim 5, wherein assigning the FWA gateway to a network slice further comprises extracting a Slice Differentiator (SD) from the S-NSSAI identifier, the SD based on a LAN device communicatively coupled to the FWA gateway.

7. The method of claim 1, wherein detecting the attachment of the FWA gateway comprises detecting one or more of a subscriber profile identity, radio access technology frequency selection priority (RFSP) index, subscribed RFSP, or slice request message.

8. A non-transitory computer-readable storage medium for tangibly storing program instructions capable of being executed by a processor, the program instructions defining steps of:
   detecting, by a base station, an attachment of an FWA gateway;
   determining, by the base station, a traffic cap to apply to the FWA gateway based on the attachment;
   generating, by the base station, a normalized data rate for the FWA gateway by weighting an achieved data rate of the FWA gateway; and
   adjusting, by the base station, a fairness criteria of a Radio Access Network (RAN) scheduler based on the normalized data rate.

9. The non-transitory computer-readable storage medium of claim 8, wherein weighting the data rate for the FWA gateway comprises computing the data rate based on observed data volumes of the FWA gateway and at least one other user equipment (UE).

10. The non-transitory computer-readable storage medium of claim 8, wherein weighting the data rate for the FWA gateway comprises computing the data rate based on a fixed weighting factor defined in a service level agreement associated with the FWA gateway.

11. The non-transitory computer-readable storage medium of claim 8, wherein weighting the data rate for the FWA gateway comprises computing a ratio between an achieved data rate of the FWA gateway and a guaranteed data rate in a service level agreement associated with the FWA gateway.

12. The non-transitory computer-readable storage medium of claim 8, further comprising assigning the FWA gateway to a network slice based on a requested a Service Slice Type (SST) value for a Single-Network Slice Selection Assistance Information (S-NSSAI) identifier, the SST value selected based on a virtual network identifier detected by the FWA gateway.

13. The non-transitory computer-readable storage medium of claim 12, wherein assigning the FWA gateway to a network slice further comprises extracting a Slice Differentiator (SD) from the S-NSSAI identifier, the SD based on a LAN device communicatively coupled to the FWA gateway.

14. The non-transitory computer-readable storage medium of claim 8, wherein detecting the attachment of the FWA gateway comprises detecting one or more of a subscriber profile identity, radio access technology frequency selection priority (RFSP) index, subscribed RFSP, or slice request message.

15. A device comprising:
   a processor configured to:
   detect an attachment of an FWA gateway;
   determine a traffic cap to apply to the FWA gateway based on the attachment;
   generate a normalized data rate for the FWA gateway by weighting an achieved data rate of the FWA gateway; and
   adjust a fairness criteria of a Radio Access Network (RAN) scheduler based on the normalized data rate.

16. The device of claim 15, wherein weighting the data rate for the FWA gateway comprises computing the data rate based on observed data volumes of the FWA gateway and at least one other user equipment (UE).

17. The device of claim 15, wherein weighting the data rate for the FWA gateway comprises computing the data rate based on a fixed weighting factor defined in a service level agreement associated with the FWA gateway.

18. The device of claim 15, wherein weighting the data rate for the FWA gateway comprises computing a ratio between an achieved data rate of the FWA gateway and a guaranteed data rate in a service level agreement associated with the FWA gateway.

19. The device of claim 15, further comprising assigning the FWA gateway to a network slice based on a requested a Service Slice Type (SST) value for a Single-Network Slice Selection Assistance Information (S-NSSAI) identifier, the SST value selected based on a virtual network identifier detected by the FWA gateway.

20. The device of claim 19, wherein assigning the FWA gateway to a network slice further comprises extracting a Slice Differentiator (SD) from the S-NSSAI identifier, the SD based on a LAN device communicatively coupled to the FWA gateway.

* * * * *